(No Model.)
F. W. BISHOP.
ADJUSTABLE VEHICLE POLE.
No. 261,988.        Patented Aug. 1, 1882.
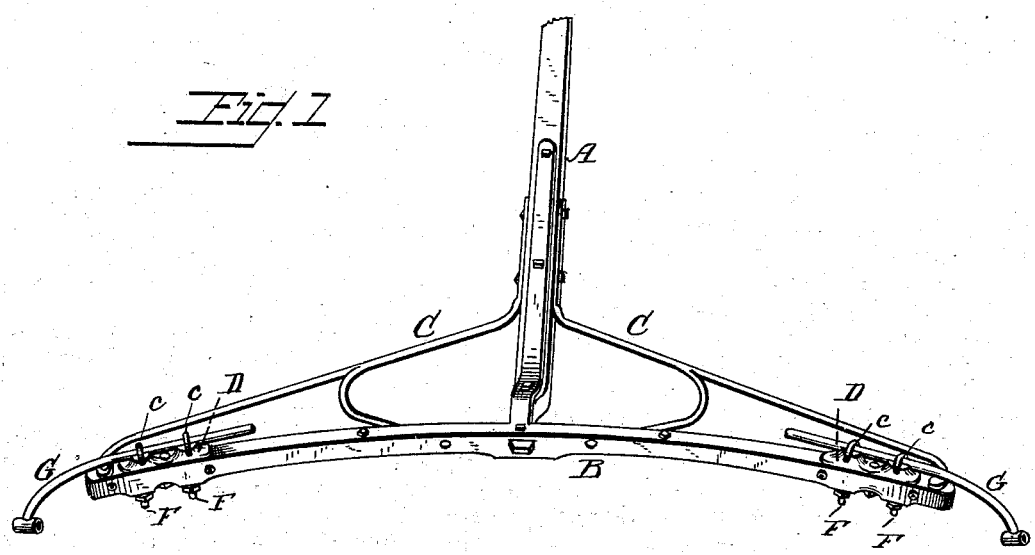
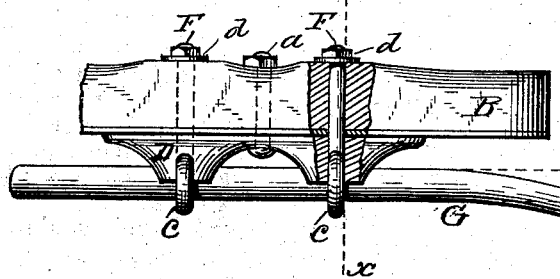
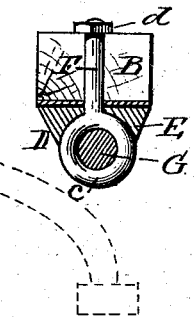
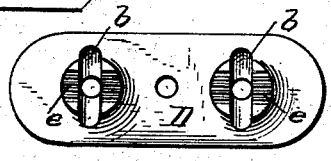
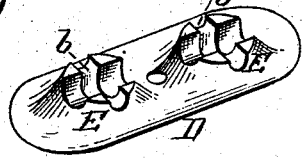
WITNESSES
Franck L. Durand
N. E. Oliphant
INVENTOR
Frederick W. Bishop,
per Chas. H. Fowler
Attorney

UNITED STATES PATENT OFFICE.

FREDRICK W. BISHOP, OF WEST HAVEN, CONNECTICUT.

ADJUSTABLE VEHICLE-POLE.

SPECIFICATION forming part of Letters Patent No. 261,988, dated August 1, 1882.

Application filed April 22, 1882. (No model.)

*To all whom it may concern:*

Be it known that I, FREDRICK W. BISHOP, a citizen of the United States, residing at West Haven, town of Orange, in the county of New Haven and State of Connecticut, have invented certain new and useful Improvements in Adjustable Carriage or Sleigh Poles; and I do hereby declare that the following is a full, clear, and exact description of the same, reference being had to the annexed drawings, making a part of this specification, and to the letters and figures of reference marked thereon.

Figure 1 of the drawings is an under side perspective view of my invention; Fig. 2, a detail view of a portion of a back bar having my invention attached; Fig. 3, a cross-section through line $x\ x$, Fig. 2; Fig. 4, an under side plan view, and Fig. 5 an under side perspective view.

This invention has relation to that class of carriage or sleigh poles that are capable of being adjusted and readily fitted to any width vehicle or sleigh.

The object and purpose of the present invention is to provide an attachment for such vehicle or sleigh poles as will be simple in its construction, and consequently cheap in cost and capable of ready attachment to the back bar of any such pole in order to accommodate the said pole to any width vehicle or sleigh.

These objects I attain by the construction substantially as shown in the drawings, hereinafter described, and claimed.

In the accompanying drawings, A represents a vehicle or sleigh pole having connected thereto a back bar, B, and braced by means of suitable braces or stays, C.

To the ends of the back bar, B, upon its under side, by means of bolts or rivets a, are secured metal blocks D, provided with concave projecting seats E, having transverse recesses b, in which fit the eyes c of eyebolts F, the bolt ends of said eyebolts being passed through the blocks D and back bar, B, and secured by nuts and washers d. Through the eyes c of the eyebolts F is passed a shackle-iron, G, which connects with the shackle-clips of the vehicle, and is capable of adjustment to or from to suit the width of such vehicle or sleigh.

The concavities of the seats E may be provided with corrugations e, as shown in Fig. 4, or made rough to prevent the adjustable shackle-iron from slipping.

When it is desired to lengthen or shorten the width between the eyes upon the shackle-irons the nuts of the eyebolts are loosened and the said shackle-irons drawn to or from in the eyes of said bolts until the proper width is attained, when the nuts are tightened up again, bringing the eyes of the eyebolts up tightly in the recesses of the seats, and thus firmly holding the shackle-irons in the position desired.

Although I have described my invention as applied to the under side of the back bar of a vehicle or sleigh tongue, the same may be as readily applied to the top, back, or front side, as may be preferred.

It will be readily seen by the foregoing description that I have constructed a light, strong, and cheaply-manufactured attachment for vehicle or sleigh poles by which the shackle-irons may be adjusted to and held at a distance to suit the width of any vehicle or sleigh, and which is capable of ready connection to any tongue provided with a back bar, thus forming a simple and tasty means for the adjustment of the shackle-irons.

This attachment may be put upon the market and sold independent of the tongue.

Having now fully described my invention, what I claim as new, and desire to secure by Letters Patent, is—

The combination, with the shackle-iron G, of the metal block D, having concave projecting seats E and transverse recess b, and the eyebolts F as a means for securing the shackle-iron to the block and admit of its adjustability, substantially as and for the purpose specified.

In testimony that I claim the above I have hereunto subscribed my name in the presence of two witnesses.

FREDRICK W. BISHOP.

Witnesses:
ELIAS T. MAIN,
ARTHUR L. MAIN.